(12) United States Patent
Bodtker

(10) Patent No.: US 9,759,265 B2
(45) Date of Patent: Sep. 12, 2017

(54) CENTERING MECHANISM FOR DOUBLE CARDAN JOINTS

(71) Applicant: STEERING SOLUTIONS IP HOLDING CORPORATION, Saginaw, MI (US)

(72) Inventor: Joen C. Bodtker, Gaines, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/459,917

(22) Filed: Aug. 14, 2014

(65) Prior Publication Data
US 2016/0047423 A1 Feb. 18, 2016

(51) Int. Cl.
| F16D 3/33 | (2006.01) |
| F16D 3/10 | (2006.01) |
| F16D 3/205 | (2006.01) |
| F16D 3/207 | (2006.01) |
| F16D 3/43 | (2006.01) |
| F16D 47/02 | (2006.01) |

(52) U.S. Cl.
CPC ............ *F16D 3/33* (2013.01); *F16D 3/10* (2013.01); *F16D 3/207* (2013.01); *F16D 3/2057* (2013.01); *F16D 3/43* (2013.01); *F16D 47/02* (2013.01); *F16D 2250/0084* (2013.01); *Y10S 464/905* (2013.01)

(58) Field of Classification Search
CPC ... F16D 3/10; F16D 3/205; F16D 3/24; F16D 2250/0084; F16D 3/32; F16D 3/33; F16D 3/207; F16D 47/02; F16D 3/46; F16D 3/2057; B23P 15/00; Y10S 464/905

USPC ........ 464/116, 118, 125, 905, 113–115, 117, 464/169; 403/138, 144
IPC ....................................................... B23P 15/00
See application file for complete search history.

(56) References Cited

U.S. PATENT DOCUMENTS

| 100,868 A | 3/1870 | Cushing | |
| 724,068 A | 3/1903 | Williams | |
| 1,355,516 A * | 10/1920 | Stahl | F16D 3/78 464/169 X |
| 2,133,176 A * | 10/1938 | Parent | F16D 3/33 464/118 X |
| 2,208,314 A * | 7/1940 | Snyder | F16D 3/68 464/169 |
| 2,712,741 A * | 7/1955 | Roller | F16D 3/78 464/169 X |

(Continued)

FOREIGN PATENT DOCUMENTS

| AT | 146861 | * 8/1936 |
| DE | 4143033 A1 | 7/1993 |
| FR | 846797 | * 9/1939 |

*Primary Examiner* — Gregory Binda
(74) *Attorney, Agent, or Firm* — Cantor Colburn LLP

(57) ABSTRACT

A joint assembly includes a first shaft having an end, a second shaft having an end, a first inner ring coupled to the first shaft, and a second inner ring coupled to the second shaft. The assembly further includes a sleeve coupled to the first and second inner rings, the first and second inner rings disposed within the sleeve, and a centering device engaging the ends of the first and second shaft. The centering device is configured to maintain the angular positions of the first and second shafts relative to one another, and the centering device is substantially fixed from rotation during rotation of the first and second shafts.

6 Claims, 7 Drawing Sheets

(56) References Cited

U.S. PATENT DOCUMENTS

| | | | |
|---|---|---|---|
| 2,978,886 A * | 4/1961 | Marquis | F16C 11/0619 |
| | | | 464/118 |
| 3,296,833 A * | 1/1967 | McCarthy | F16D 3/30 |
| | | | 464/116 |
| 3,375,044 A | 3/1968 | Peterson | |
| 3,792,597 A * | 2/1974 | Orain | F16D 3/33 |
| | | | 464/118 X |
| 5,433,667 A * | 7/1995 | Schafer | F16D 3/32 |
| | | | 464/118 |
| 6,802,275 B2 * | 10/2004 | Schmidt | F16C 11/0604 |
| 6,840,864 B2 | 1/2005 | Dupuie et al. | |
| 7,144,325 B2 | 12/2006 | Cornay et al. | |
| 2016/0047424 A1 * | 2/2016 | Bodtker | F16D 3/42 |
| | | | 464/114 |

* cited by examiner

US 9,759,265 B2

CENTERING MECHANISM FOR DOUBLE CARDAN JOINTS

FIELD OF THE INVENTION

The present disclosure generally relates to joints, more specifically, to centering mechanisms for double universal or cardan joints.

BACKGROUND OF THE INVENTION

It may be desirable to communicate rotation between a first shaft and a second shaft extending away from one another at an angle. The first shaft can be a driving shaft and the second shaft can be a driven shaft. The shafts can be connected to one another with a single universal joint, an arrangement known as a Hooke joint. However, the driven shaft may not rotate at a uniform angular velocity. In particular, during revolution the driven shaft may experience angular acceleration and deceleration in response to relatively constant angular velocity of the driving shaft.

A cardan joint engages two shafts with respect to another with an intermediate, revolving coupling member. First and second universal joints connect the first and second shafts, respectively, to the intermediate coupling member. The cardan joint arrangement imparts constant velocity to the driven shaft. The cardan joint can include a centering plate positioned in the intermediate coupling member that engages both shaft ends to generally maintain the same output angle of the driven shaft as the input angle of the driving shaft with respect to the coupling member. The centering plate can define an aperture for receiving rounded ends of the shafts. Alternatively, the centering plate can define rounded projections receivable in an aperture defined by the shafts.

Use of cardan joints in high joint angle applications may require more space, which may increase size, cost, and friction. Accordingly, it is desirable to provide a simple double joint that can operate at high joint angles.

SUMMARY OF THE INVENTION

In one aspect, a joint assembly is provided. The assembly includes a first shaft having an end, a second shaft having an end, a first inner ring coupled to the first shaft, and a second inner ring coupled to the second shaft. The assembly further includes a sleeve coupled to the first and second inner rings, the first and second inner rings disposed within the sleeve, and a centering device engaging the ends of the first and second shaft. The centering device is configured to maintain the angular positions of the first and second shafts relative to one another, and the centering device is substantially fixed from rotation during rotation of the first and second shafts.

In another aspect, a double cardan joint is provided. The double cardan joint includes a driven shaft having an end, a driving shaft having an end, a first universal joint coupled to the driven shaft, and a second universal joint coupled to the driving shaft. The cardan joint further includes a sleeve coupled to the first and second universal joints, the first and second universal joints disposed within the sleeve, and a centering device engaging the end of the driven shaft and the end of the driving shaft. The centering device is configured to maintain the angular positions of the driven and driving shafts relative to one another, and the centering device is substantially fixed from rotation during rotation of the driven and driving shafts.

In yet another aspect, a method of assembling a joint assembly is provided. The method includes providing a first shaft having an end, providing a second shaft having an end, providing a first inner ring and a second inner ring, and providing a sleeve. The method further includes rotatably coupling the first inner ring to the sleeve and the first shaft, the first inner ring disposed within the sleeve, rotatably coupling the second inner ring to the sleeve and the second shaft, the second inner ring disposed within the sleeve, and providing a centering device engaging the ends of the first and second shafts. The centering device is configured to maintain the angular positions of the first and second shafts relative to one another, and the centering device is substantially fixed from rotation during rotation of the first and second shafts.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
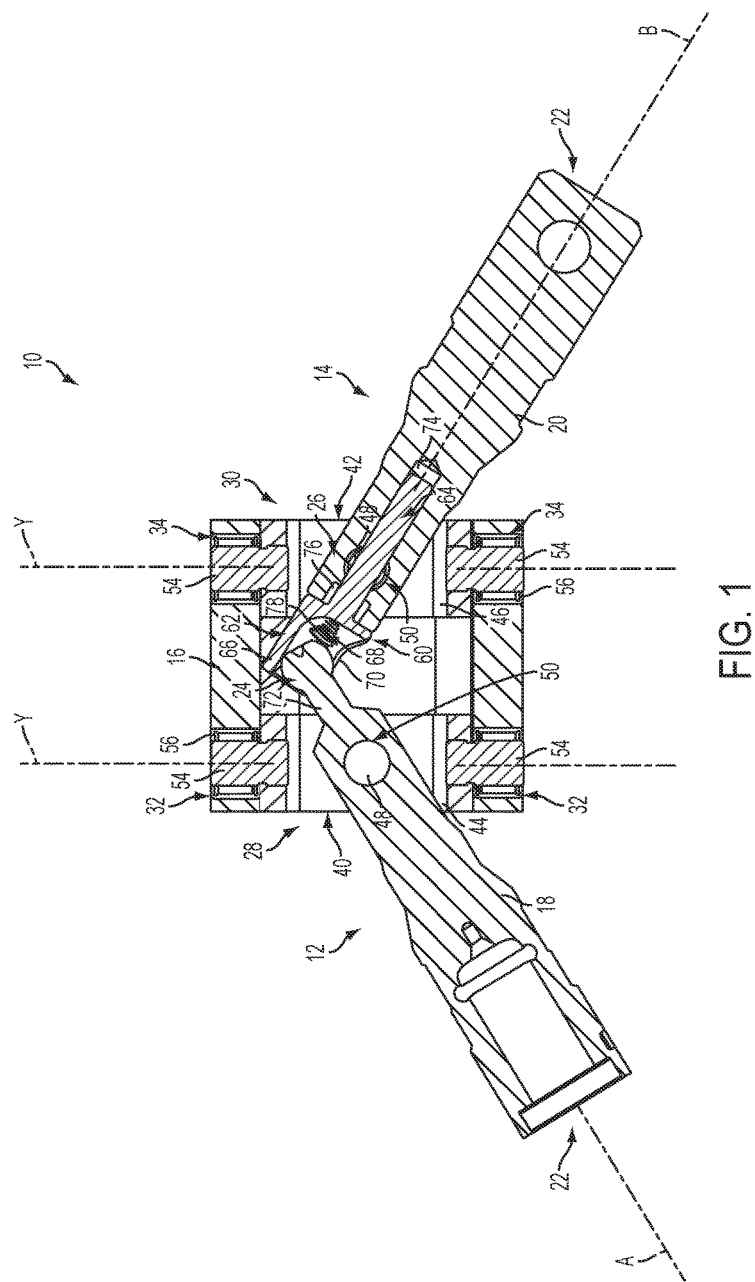
FIG. 1 is a cross-sectional view of an exemplary joint assembly.

Referring now to the Figures, where the invention will be described with reference to specific embodiments, without limiting same, FIGS. 1-4 illustrate an exemplary constant velocity joint assembly 10 that generally includes a first shaft assembly 12 and a second shaft assembly 14 which are joined in articulated, jointed manner by an outer housing or intermediate coupling member or sleeve 16. Torque from shaft assembly 12 is transmitted to second shaft assembly 14 through sleeve 16 through an angle. As explained herein, joint assembly 10 is capable of operating over a range of angles, but for a given application the effective angle between the respective axes of shaft assemblies 12, 14 can be fixed at a predetermined angle.

In the exemplary embodiment, constant velocity joint assembly 10 maintains constant velocity at a large joint angle, for example 43° to 83°, while reducing or eliminating any wobbling or lash between the components of joint assembly 10 that are subjected to torque and bending loads in operation. These considerations are achieved in a joint having a small package size.

Figure 2:
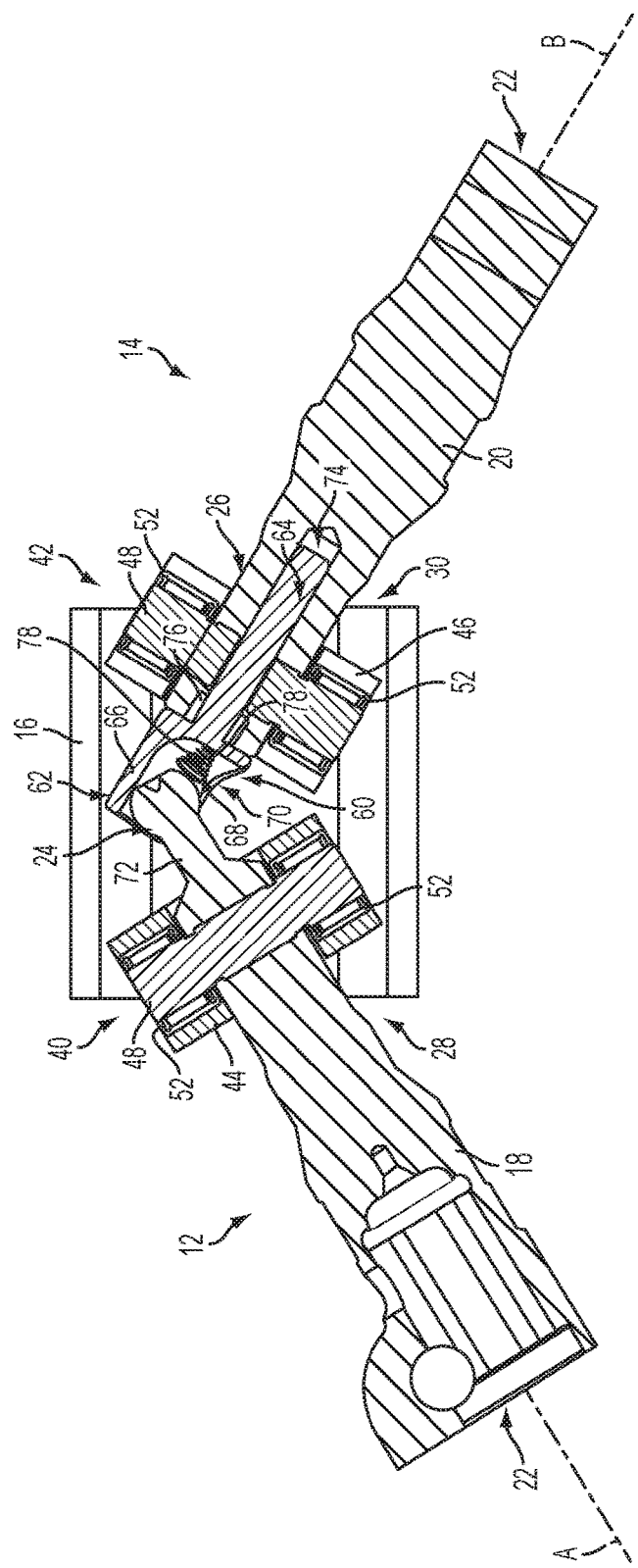
FIG. 2 is another cross-sectional view of the joint assembly shown in FIG. 1.

As illustrated in FIGS. 1-4, shaft assemblies 12, 14 each have respective shafts 18, 20 that extend along respective axes 'A' and 'B' (FIGS. 1 and 2). Shafts 18, 20 are provided at axially outer ends with connecting features 22 which enable the free axial ends of shaft assemblies 12, 14 to be joined to respective driving and driven shafts (not shown) whose axes can be offset at a predetermined, fixed angle (e.g., 63°±20°). In use, the predetermined angle is the angle that axes 'A', 'B' are fixed through the connection of shaft assemblies 12, 14 to the respective shafts (not shown). In this way, joint assembly 10 can operate as an intermediate shaft between the torque-transmitting drive and driven shafts mentioned above. Alternatively, shafts 18, 20 may have a yoke configuration (not shown).

Shaft 18 terminates at its axially inner end in a stud ball or end 24, and shaft 20 terminates at is axially inner end in an end 26. Inners ends 24, 26 are received within sleeve 16 through opposite open ends 28 and 30. In the exemplary embodiment, sleeve 16 includes a generally cylindrical, open-ended housing having two sets of axially aligned pin holes or openings 32 and 34 (see FIG. 3)

Figure 3:
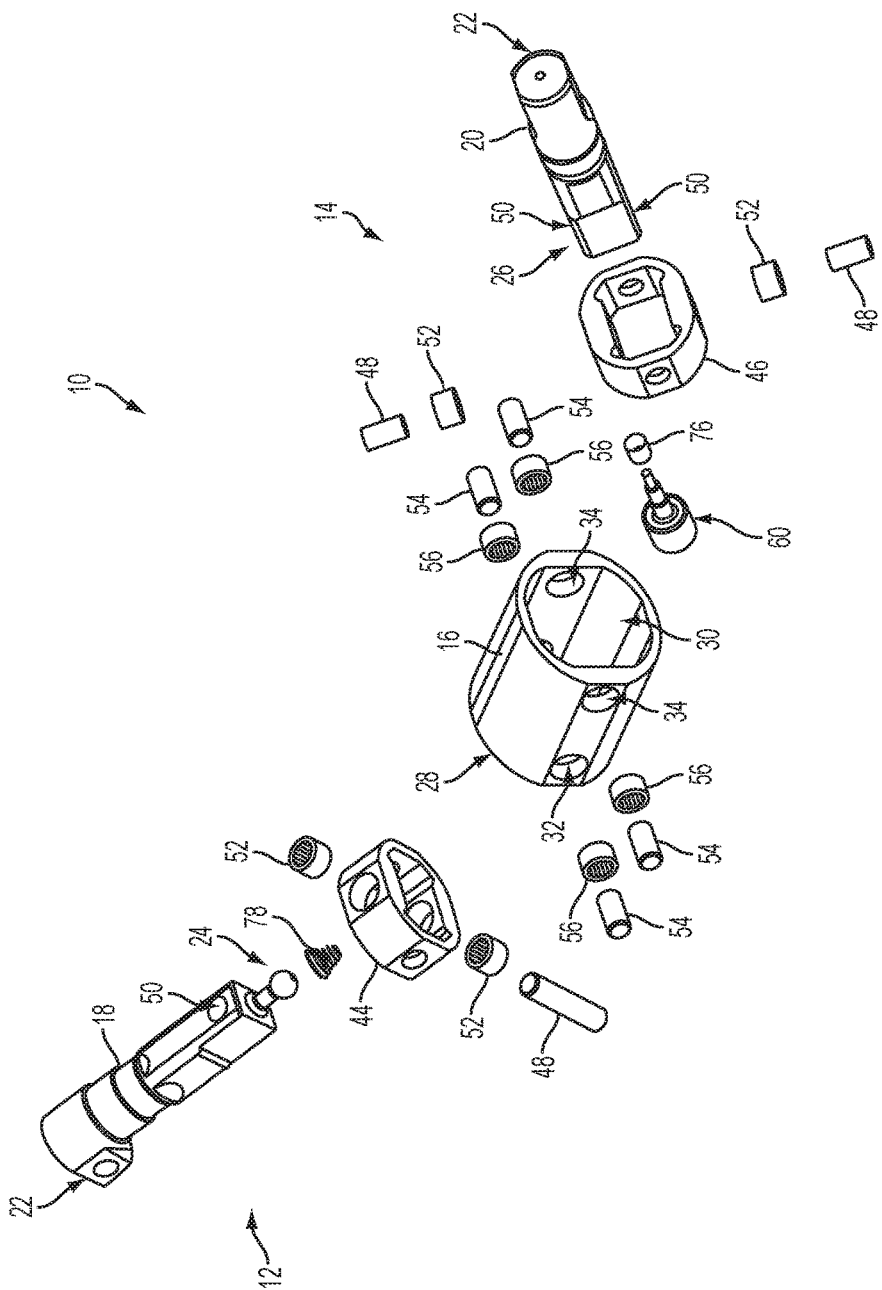
FIG. 3 is an exploded view of the joint assembly shown in FIGS. 1 and 2 before assembly.
Figure 4:
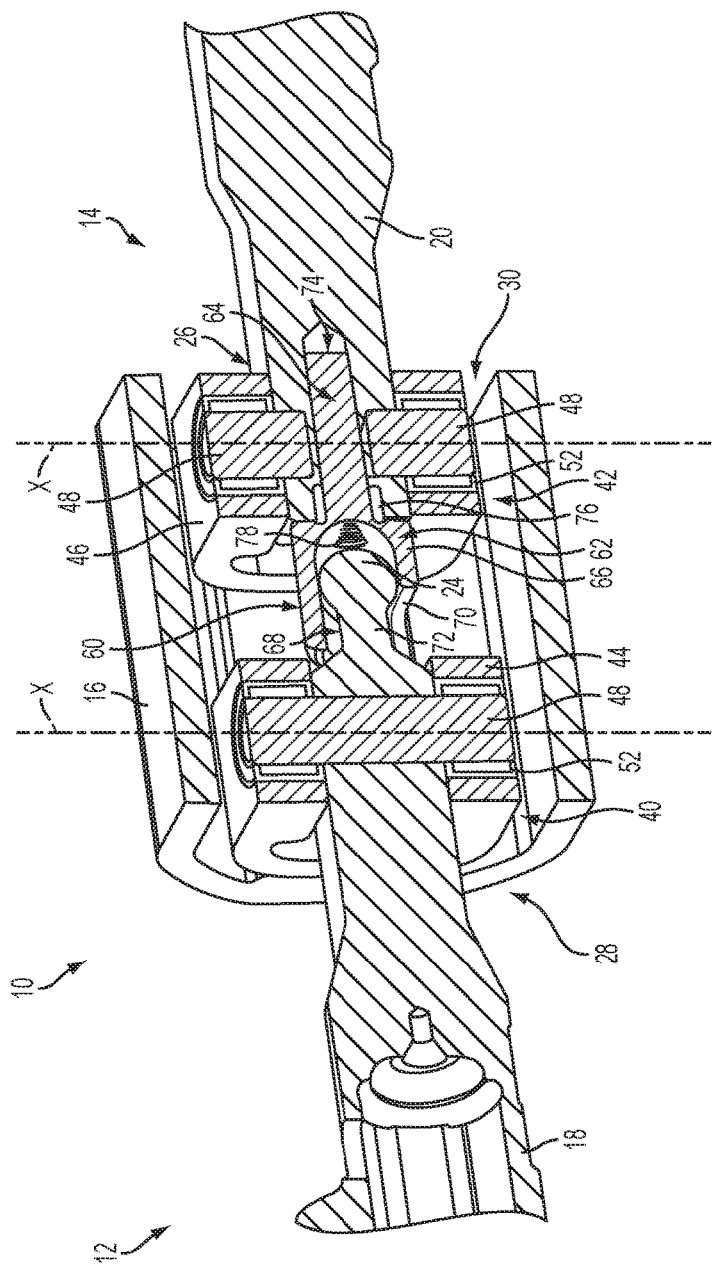
FIG. 4 is a perspective cross-sectional view of the joint assembly shown in FIGS. 1-3.

As illustrated in FIGS. 3 and 4, shaft assembly 12 includes a universal joint 40, and shaft assembly 14 includes a universal joint 42. U-joint 40 includes an inner ring 44, and u-joint 42 includes an inner ring 46. Each ring 44, 46 is arranged concentrically about its respective shaft 18, 20 and is coupled in articulated manner to its respective shaft 18, 20 by means of cross pins 48. Alternatively, rings 44, 46 may be a spider or cross trunnion. As shown in FIG. 4, cross pins 48 extend through a bores 50 in each of shafts 18, 20 and are coupled at their axial free ends by bearings 52 to inner rings 44, 46 such that inner rings 44, 46 are able to pivot about a central axis 'X' of cross pin 48 relative to shaft 18, 20. Each of inner rings 44, 46 carries a set of bearing pins 54, which may be welded or otherwise fixed to inner ring 44, 46 and project outwardly from ring 44, 46 along an axis 'Y' (FIG. 1) which is perpendicular to axis 'X'. Bearings 56 support bearing pins 54 within housing 16. Axes 'Y' lie in the same plane so that axis 'X', 'Y' of each shaft assembly 12, 14 intersect one another and the respective axes 'A', 'B' at a common point.

Bearings pins 54 are received within bearings 56 disposed in pin holes 32, 34 to enable inner rings 44, 46 to pivot relative to sleeve 16 about the axes 'Y' of bearing pins 54. In this manner, shafts 18, 20 are free to pivot in all directions relative to sleeve 16 and constrained only by contact of shafts 18, 20 with the side walls of rings 44, 46 while being fixed against rotation relative to sleeve 16. In this way, joint assembly 20 is able to transmit torque between shaft assemblies 12, 14 and sleeve 16 through an angle between axes 'A', 'B' of shafts 18, 20.

Referring to FIGS. 1-4, shafts 18, 20 may be fixed relative to one another within sleeve 16. In this way, joint assembly 10 includes an attachment or centering device 60, which can maintain the angular positions of shafts 18, 20 relative to one another such that in operation, the output angle of the joint is the same as that of the input angle through shaft assemblies 12, 14 relative to sleeve 16. At other joint angles (e.g., deviations from the nominal joint angle), the input angle and output angle relative to sleeve 16 may differ.

In the exemplary embodiment, centering device 60 generally includes a socket portion 62 and a shaft portion 64. Socket portion 62 includes an outer wall 66 defining a receiving socket 68, and a slot 70 formed in outer wall 66. Receiving socket 68 is configured to receive stud ball 24, and slot 70 is configured to allow a neck 72 of shaft 18 to translate therein, which enables angular adjustment between first shaft 18 and second shaft 20. Centering device shaft portion 64 extends into a bore 74 formed in second shaft 20, which may include a bushing 76, a rolling element bearing (not shown), or the like. As such, centering device 60 is rotatable about axis 'B' within bore 74 and bushing 76. A biasing mechanism 78 such as a spring may be optionally disposed within receiving socket 68 between stud ball 24 and the inside of receiving socket 68 to axially bias centering device 60 into shaft 20.

Centering device 60 is rotatable with respect to second shaft 20. As such, as the joint rotates at a given joint angle, centering device 60 stays fixed or substantially fixed in place while stud ball 24 spins inside socket portion 62 in concert with first shaft 18.

Figure 5:
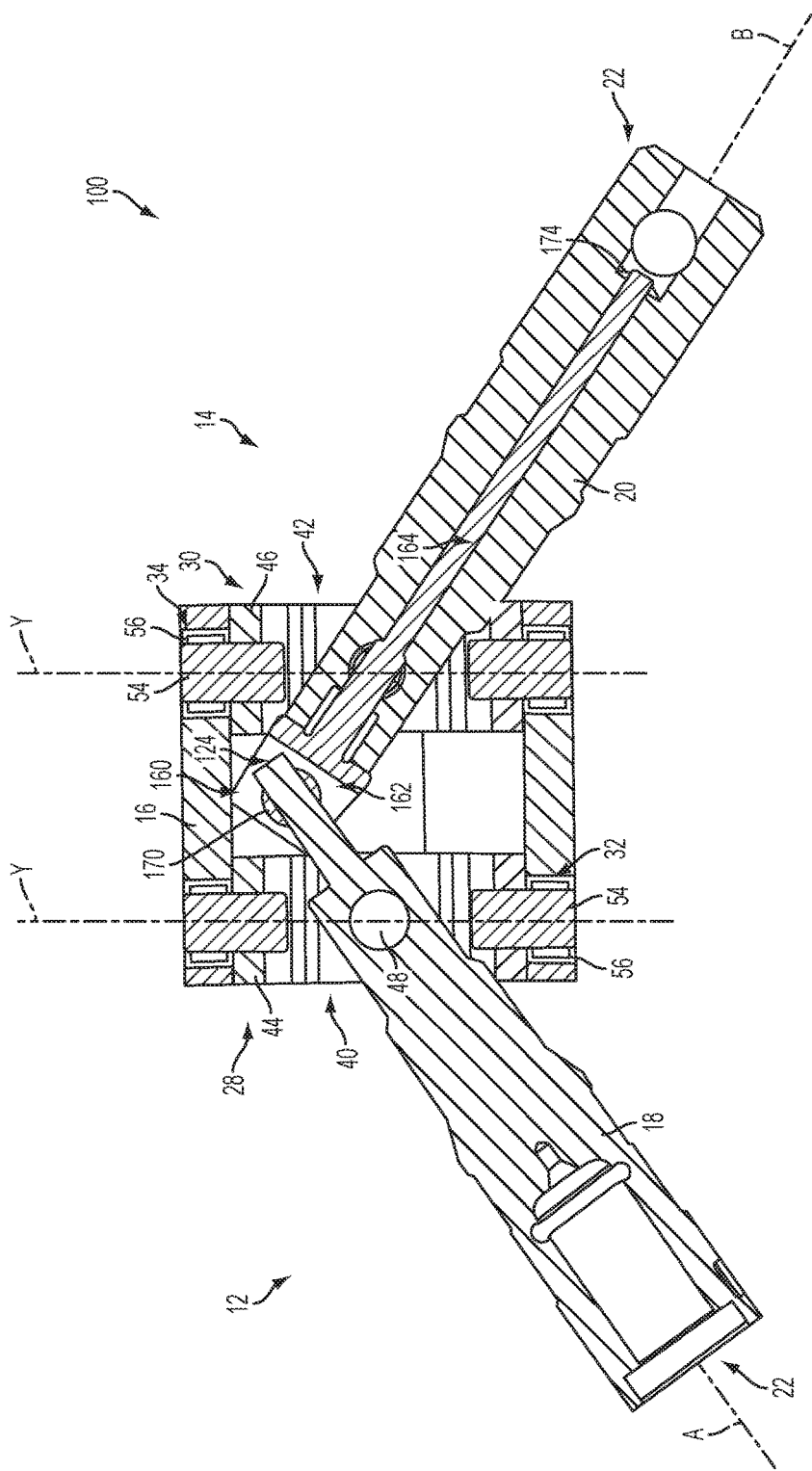
FIG. 5 is a cross-sectional view of another exemplary joint assembly.
Figure 6:
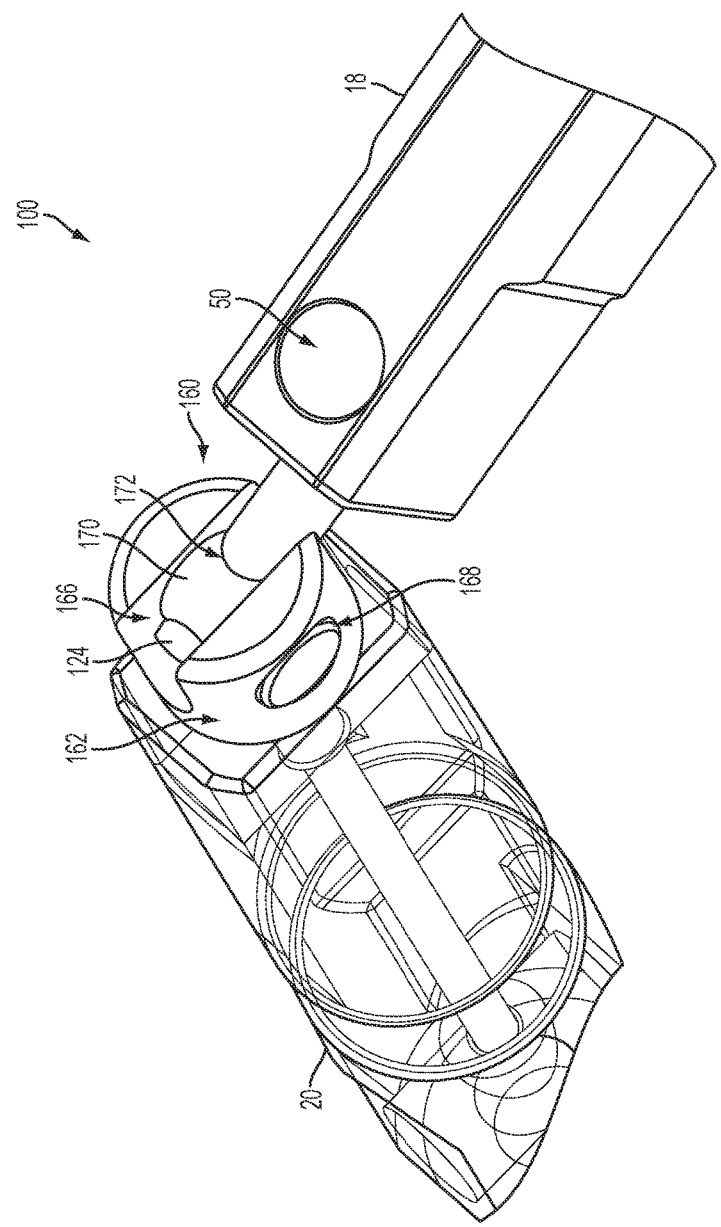
FIG. 6 is a perspective view of a portion of the joint assembly shown in FIG. 5.

FIGS. 5 and 6 illustrate a joint assembly 100 that is similar to joint assembly 10 shown in FIGS. 1-4 except joint assembly 100 includes an attachment or centering device 160 and shaft 18 includes pin 124. In the exemplary embodiment, centering device 160 and pin 124 define a pin and clevis joint, which maintains the angular positions of shafts 18, 20 relative to one another such that in operation, the output angle of the joint is the same as that of the input angle through shaft assemblies 12, 14.

Centering device 160 generally includes a clevis portion 162 and a shaft portion 164. Clevis portion 162 includes an access slot 166, trunnion apertures 168, and a trunnion 170 having a cross aperture 172. Trunnion 170 is disposed within trunnion apertures 168 and pin 124 is inserted into cross aperture 172. As such, access slot 166 enables pin 124 and trunnion 170 to rotate within clevis portion 162, which enables angular adjustment between first shaft 18 and second shaft 20. Centering device shaft portion 164 extends into bore 74 formed in second shaft 20, which may include bushing 76. As such, centering device 160 is rotatable about axis 'B' within bore 74 and bushing 76. A retainer 174 may be optionally disposed within bore 74 and coupled to shaft portion 164 to axially fix centering device 160 to shaft 20, but allow centering device 160 to rotate freely about spin axis 'B' of shaft 20.

Centering device 160 is rotatable with respect to second shaft 20. As such, as the joint rotates at a given joint angle, centering device 160 stays fixed or substantially fixed in place while pin 124 spins inside trunnion 170 in concert with first shaft 18.

Figure 7:
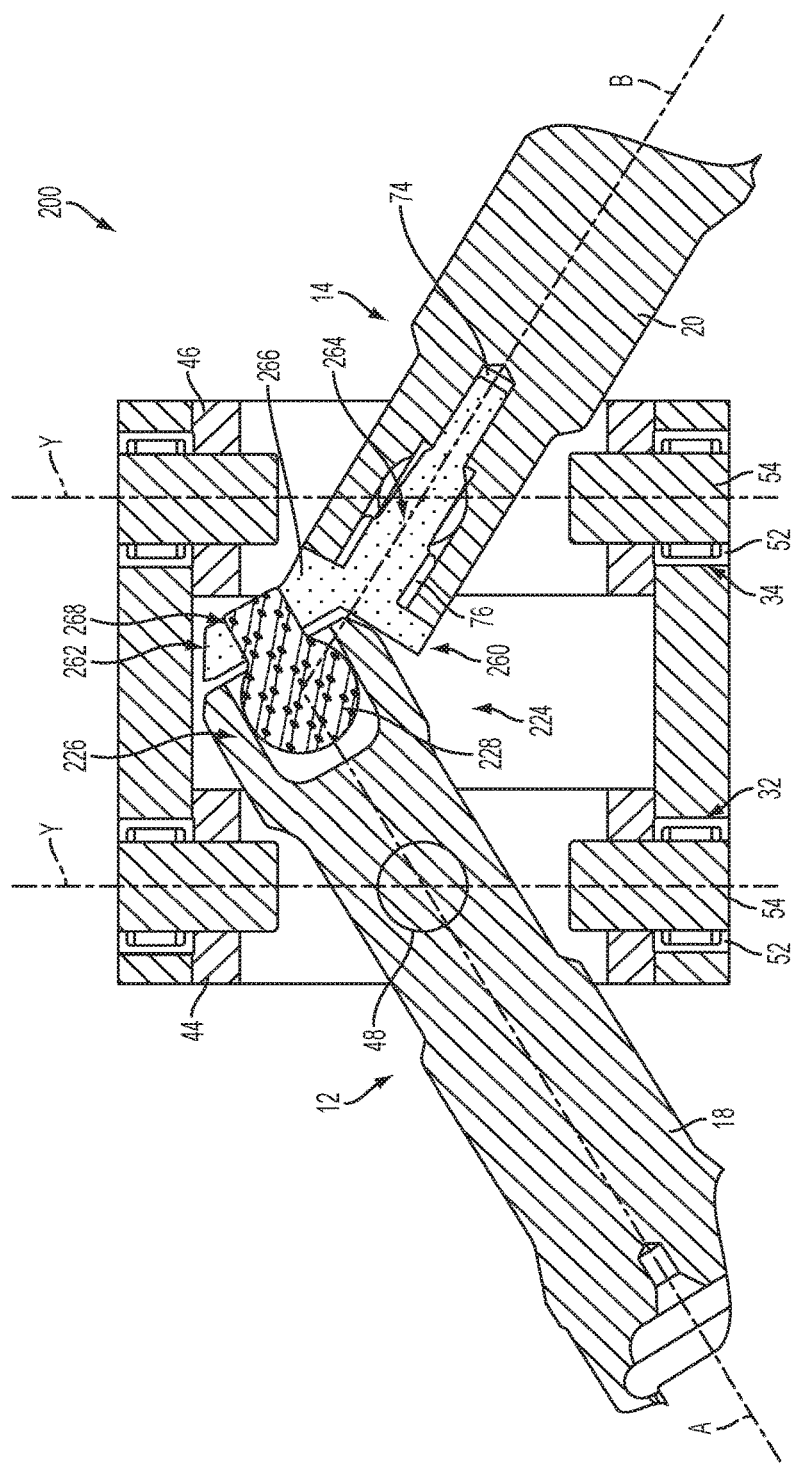
FIG. 7 is a cross-sectional view of yet another exemplary joint assembly.

FIG. 7 illustrates a joint assembly 200 that is similar to joint assembly 10 shown in FIGS. 1-4 except joint assembly 200 includes an attachment or centering device 260 and shaft 18 includes an end 224 having a socket 226. Centering device 260 maintains the angular positions of shafts 18, 20 relative to one another such that in operation, the output angle of the joint is the same as that of the input angle through shaft assemblies 12, 14.

In the exemplary embodiment, centering device 260 generally includes a socket portion 262 and a shaft portion 264. Socket portion 262 includes a plate 266 and a ball stud 268 extending therefrom, which is rotatable within socket 226. Centering device shaft portion 264 extends into bore 74, which may include bushing 76. As such, centering device 260 is rotatable about axis 'B' within bore 74 and bushing 76. In this way, as the joint rotates at a given joint angle, centering device 260 stays fixed or substantially fixed in place while socket 226 rotates within centering device 260 about ball 228 along axis 'A' of first shaft 18.

A method of assembling joint assembly 10 includes providing shafts 18, 20, providing universal joints 40, 42, providing sleeve 16, and providing centering device 60. Universal joints 40, 42 are rotatably coupled to the sleeve 16 and to respective shafts 18, 20 such that universal joints 40, 42 are disposed at least partially within sleeve 16. Centering device 60 is positioned to engage shaft ends 24, 26 to maintain the angular positions of shafts 18, 20 relative to one another. During rotation of shafts 18, 20, centering device 60 is fixed or substantially fixed from rotation relative to shafts 18, 20, and therefore must be free to allow shaft 20 to rotate with respect to centering device 60.

Described herein are systems and method for a double joint assembly. In one embodiment, the double joint assembly may be a double cardan joint or universal joint. The joint assembly includes a centering device that couples first and second rotating shafts and maintains the relative angular positions therebetween. The centering device is disposed within the second shaft, which rotates relative thereto, and the first shaft is rotatable within the centering device. The centering device remains fixed in space while rotary motion is transferred from one shaft to the other. As such, the joint assembly retains the simplicity of lower angle joints while operating at constant velocity at higher angle joints without requiring more space.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A joint assembly comprising:
a first shaft having an end that includes a ball stud;
a second shaft having an end that defines a bore;
a first inner ring coupled to the first shaft;
a second inner ring coupled to the second shaft;
a sleeve coupled to the first and second inner rings, the first and second inner rings disposed within the sleeve;
a centering device engaging the ends of the first and the second shaft, a portion of the centering device being rotatably received within the bore, the centering device comprising:
a socket portion having an outer wall defining a socket that receives the ball stud and the outer wall includes a slot formed therein to provide clearance for a neck of the first shaft end, and
a biasing mechanism disposed within the socket portion between the ball stud and an inside of the socket portion to axially bias the centering device into the second shaft; and
a bushing device disposed in the bore to facilitate rotation of the second shaft about the centering device.

2. The joint assembly of claim 1, wherein the centering device further comprises a shaft portion that extends into the bore of the second shaft.

3. A double cardan joint comprising:
a first shaft having an end that includes a ball stud;
a second shaft having an end, the first shaft and the second shaft being oriented at an angle relative to one another, the angle being between approximately 43° and approximately 83';
a first inner ring coupled to the first shaft;
a second inner ring coupled to the second shaft;
a first universal joint coupled to the first shaft;
a second universal joint coupled to the second shaft;
a sleeve coupled to the first and second universal joints, the first and second universal joints disposed within the sleeve; and
a centering device engaging the end of the first shaft and the end of the second shaft, the centering device comprising a socket portion having an outer wall defining a receiving socket that receives the ball stud and a biasing mechanism disposed within the receiving socket that axially biases the centering device into the second shaft.

4. The double cardan joint of claim 3, further comprising:
a first set of bearing pins projecting from the first universal joint into the sleeve; and
a second set of bearing pins projecting from the second universal joint into the sleeve, the first and second set of bearings pins establishing a jointed connection between the first and second universal joints and the sleeve for rotation of the sleeve in response to rotation of the first and second universal joints about their respective axes.

5. The double cardan joint of claim 3, wherein the second shaft end comprises a bore to rotatably receive a portion of the centering device.

6. A double cardan joint comprising:
a driven shaft having an end that includes a ball stud;
a driving shaft having an end;
a first universal joint coupled to the driven shaft;
a second universal joint coupled to the driving shaft;
a sleeve coupled to the first and second universal joints, the first and second universal joints disposed within the sleeve;
a centering device engaging the end of the driven shaft and the end of the driving shaft, the centering device comprising a socket portion having an outer wall defining a receiving socket that receives the ball stud and a biasing mechanism disposed within the receiving socket that axially biases the centering device into the driving shaft;
a first set of bearing pins projecting from the first universal joint into the sleeve; and
a second set of bearing pins projecting from the second universal joint into the sleeve, the first and second set of bearings pins establishing a jointed connection between the first and second universal joints and the sleeve for rotation of the sleeve in response to rotation of the first and second universal joints about their respective axes,
the driven shaft end comprises a bore to rotatably receive a portion of the centering device, and
the outer wall includes a slot formed therein to provide clearance for a neck of the driven shaft end.

* * * * *